United States Patent [19]

Naffziger

[11] Patent Number: 5,677,863

[45] Date of Patent: Oct. 14, 1997

[54] METHOD OF PERFORMING OPERAND INCREMENT IN A BOOTH RECODED MULTIPLY ARRAY

[75] Inventor: Samuel D. Naffziger, Fort Collins, Colo.

[73] Assignee: Hewlett-Packard Co., Palo Alto, Calif.

[21] Appl. No.: 627,615

[22] Filed: Apr. 4, 1996

[51] Int. Cl.⁶ .................................................. G06F 7/52
[52] U.S. Cl. ................................................... 364/760
[58] Field of Search .................................. 364/760, 759, 364/757, 754, 750.5

[56] References Cited

U.S. PATENT DOCUMENTS

| | | | |
|---|---|---|---|
| 5,485,413 | 1/1996 | Kuboniwa | 364/760 |
| 5,521,855 | 5/1996 | Yamazaki | 364/760 |
| 5,521,856 | 5/1996 | Shiraishi | 364/760 |

OTHER PUBLICATIONS

A.D. Booth, "A Signed Binary Multiplication Technique", Quarterly Journal of Mechanics and Applied Mathematics, 4(2):236–240, (Jun. 1951).

O.L. MacSorley, "High–Speed Arithmentic in Binary Computers", Proceedings of the IRE, 49(1):67–91, (Jan. 1961).

U.S. Patent Application of Naffziger filed concurrently herewith entitled "2's Complement Floating—Point Multiply Accumulate Unit".

Primary Examiner—Tan V. Mai

[57] ABSTRACT

A new and unique method of performing operand increment in a Booth recoded multiply array. Use of the new method allows operands to be incremented without adding any delay to the multiply array. Added hardware is minimal and requires very little surface area on an IC. The method comprises partitioning a multiplier into overlapping groups of N bits, wherein a first of a number of multiplier partitions comprises the multiplier's least significant bits, and a placeholder bit of less significance than the multiplier's least significant bits. The placeholder bit is set to a logic "1" when desiring to increment the multiplier. Multiples of a multiplicand are generated. Generation of even multiples necessitates shifts of the multiplicand. Bit vacancies created during these shifts are filled with logic "1"s when desiring to increment the multiplicand. Multiplicand multiples are then inverted. The multiplicand increment bit is exclusively ORed with the sign bit of each of the generated multiplicand multiples, and the outputs of the exclusive OR gates are added to the least significant bit positions of respective multiplicand multiples. Operation of the multiply array is otherwise similar to the operation of a standard Booth recoded multiply array.

16 Claims, 5 Drawing Sheets

| PARTIAL PRODUCT MAPPINGS ||
| PARTITION | MULTIPLE OF MULTIPLICAND |
| 0 0 0 | +0 |
| 0 0 1 | +M |
| 0 1 0 | +M |
| 0 1 1 | +2M |
| 1 0 0 | -2M |
| 1 0 1 | -M |
| 1 1 0 | -M |
| 1 1 1 | -0 |

METHOD OF PERFORMING OPERAND INCREMENT IN A BOOTH RECODED MULTIPLY ARRAY

BACKGROUND OF THE INVENTION

This invention pertains to a method of performing operand increment in a Booth recoded multiply array, and more particularly, to a method of incrementing either one or both operands of a multiply array as part of its multiply function. The method is significant in that unlike conventional methods of performing operand increment, no additional delay is incurred, and no additional partial product slots are required.

A Booth recoded multiply array is an efficient way to multiply two binary numbers stored in a computer. Such arrays were first proposed by A. D. Booth, and are described in detail in A. D. Booth, "A Signed Binary Multiplication Technique", *Quarterly Journal of Mechanics and Applied Mathematics*, 4(2):236–240, (June 1951) and O. L. MacSorley, "High-Speed Arithmetic in Binary Computers", *Proceedings of the IRE*, 49(1):67–91, (January 1961). Both of these articles are hereby incorporated by reference for all that they disclose.

Multiply arrays are a common component of VLSI (very large scale integrated) circuits such as microprocessors. Unfortunately, it is often necessary to increment one or both of the operands being input into a multiply array.

A conventional method of incrementing either a multiplicand or multiplier is to use an extra partial product slot (i.e., additional rows of carry save adders, counters, compressors, or the like) to achieve one or both increments. In a multiplier in which only one of its operands is subject to increment, an additional row of carry save adders (CSAs) is needed (i.e., (A+1)*B=AB+B). If either or both of the operands are subject to increment, three partial product slots, and thus three additional rows of CSAs, must be added (i.e., (A+1)*(B+1)=AB+A+B+1). These additional components add a significant amount of delay to the multiply array, and take up precious surface area on an IC (integrated circuit).

It is therefore a primary object of this invention to provide a method of performing operand increment in a Booth recoded multiply array wherein the delay of the "increment & multiply" array is no different than the delay of a conventional "multiply only" array.

It is a further object of this invention to provide a method of performing operand increment in a Booth recoded multiply array wherein no additional partial product slots and/or carry save adders are required.

SUMMARY OF THE INVENTION

In the achievement of the foregoing objects, the inventor has devised a new and unique method of performing operand increment in a Booth recoded multiply array. The method comprises partitioning a multiplier into overlapping groups of N bits, wherein a first of a number of multiplier partitions comprises the multiplier's least significant bits, and a placeholder bit of less significance than the multiplier's least significant bits. The placeholder bit is set (i.e., forced to a logic "1") when desiring to increment the multiplier.

Conventional Booth recoded multiply arrays already require the above-mentioned placeholder bit. However, it is merely a placeholder, and is always forced to a logic "0". Thus, no additional hardware components are required to increment the multiplier. The only hardware "change" is a wire routing.

Multiples of a multiplicand are generated as required by Booth's algorithm. When multiple generation requires a multiplicand to be shifted, bit vacancies created during these shifts are filled with bits corresponding to a multiplicand increment bit. If the increment bit is set (i.e., a logic "1"), the vacancies are filled with "1"s. Otherwise, they are filled with "0"s. Since Booth recoding requires partial products to be in 2's complement form, negative multiples are inverted. Rather than adding a 2's complement conversion bit to all multiples of the multiplicand (i.e., an increment equal to a multiple's sign bit), the 2's complement conversion bit is exclusively ORed with a multiplicand increment bit, and the output of the XOR (exclusive OR) gate is added to a multiple in place of the standard 2's complement conversion bit. These changes to a Booth recoded multiply array have the affect of incrementing a ±1M multiple (where M is the value of the multiplicand) by ±1, a ±2M multiple by ±2, and so on.

Filling bit vacancies of a shifter with multiplicand increment bits requires little more than the re-routing of wires. And since conventional Booth recoded multiply arrays already provide for adding a 2's complement conversion bit to each multiple of the multiplicand (the 2's complement conversion bit for a positive number merely being a "0"), the only additional hardware component required to implement an increment of the multiplicand is a plurality of XOR logic gates.

Operation of the "increment and multiply" Booth recoded multiply array is otherwise similar to the operation of a conventional "multiply only" Booth recoded multiply array.

Thus, one can appreciate that the above operations are performed without adding to the delay of a multiply array. Furthermore, the increment operations require the addition of very little hardware. The hardware that is added is 1) low-cost, 2) requires little surface area on an IC, and 3) is not added to the multiply array's critical delay path(s).

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawing in which.

DESCRIPTION OF THE PREFERRED EMBODIMENT

Figure 1:
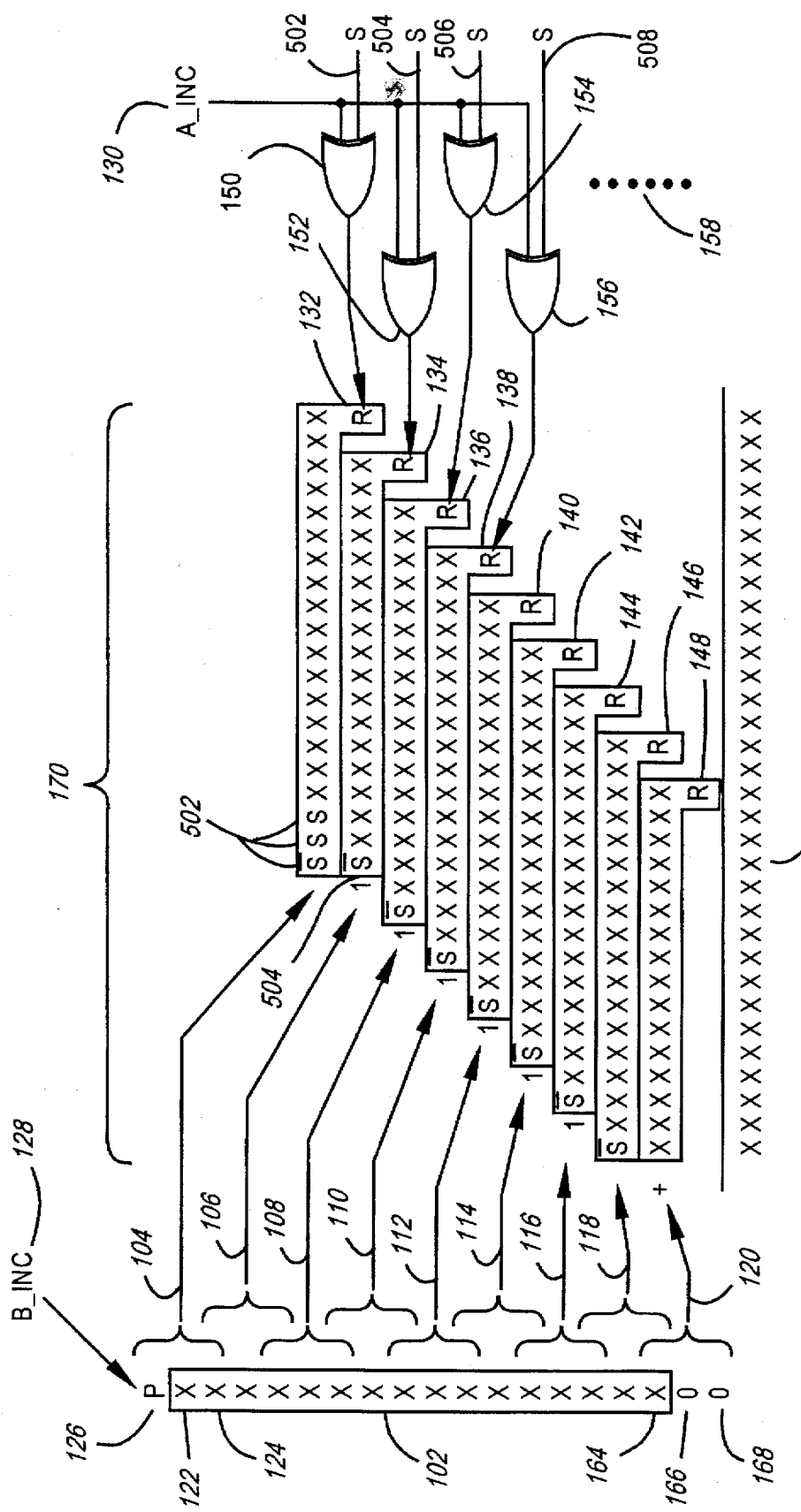
FIG. 1 is a schematic illustrating a Booth recoded multiply array wherein either or both of its operands may be incremented.
Figure 4:
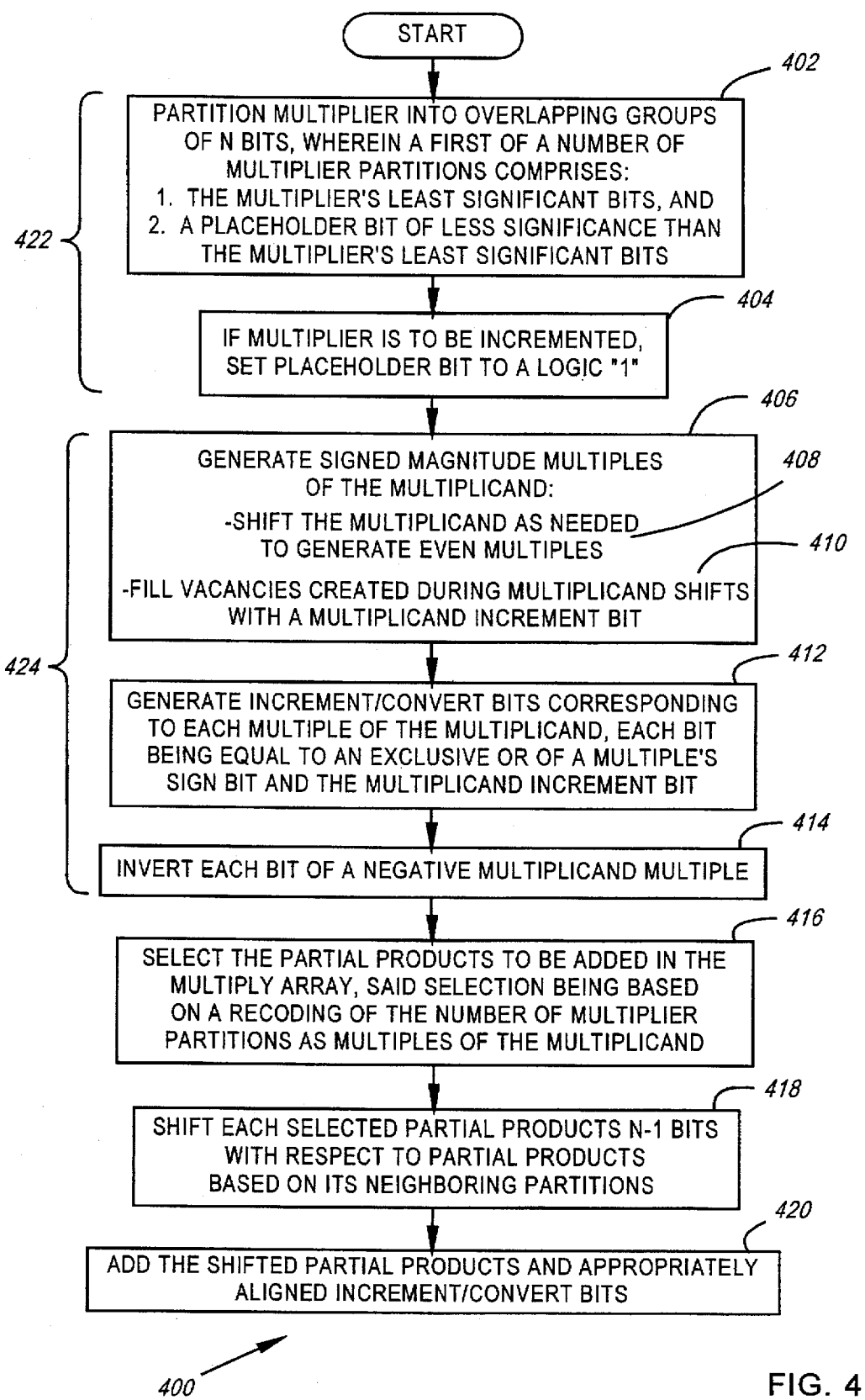
FIG. 4 is a flow chart illustrating the steps involved in incrementing either or both operand of a Booth recoded multiply array.

A method 400 of incrementing either or both of the operands (the multiplicand and/or the multiplier 102) in a Booth recoded multiply array 100 (FIG. 1) is diagramed in FIG. 4. A multiply array 100 used in implementing such a method 400 is illustrated in FIG. 1.

If desiring to increment a multiplier 102, the method 422 generally begins with a partitioning 402 of the multiplier 102 into overlapping groups 104–120 of N bits. The multiplier 102 is partitioned 402 such that a first 104 of a number of multiplier partitions 104–120 comprises 1) the multiplier's least significant bits 122, 124, and 2) a placeholder bit 126 of less significance than the multiplier's least significant bits 122, 124. If the multiplier 102 is to be incremented, the placeholder bit 126 in the multiplier's first partition 104 is set 404 to a logic "1"; otherwise, the placeholder bit 126 is set to a logic "0".

Figures 2, 3:
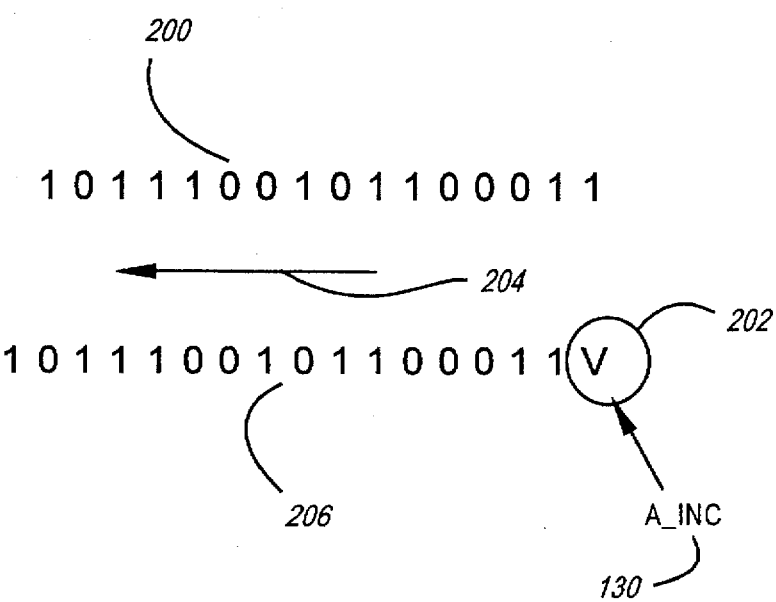
FIG. 2 illustrates the filling of bit vacancies created during the generation of a multiplicand multiple.
FIG. 3 is a table illustrating the mapping of multiplier partitions into multiples of a multiplicand.

If desiring to increment a multiplicand, the method 424 generally begins with the generation 406 of one or more signed magnitude multiples 302–312 (FIG. 3) of the multiplicand. Generation of even multiples 306, 308 necessitates shifting 408 the multiplicand 200 (FIG. 2). Least significant bit vacancies 202 created during multiplicand shifts are filled 410 with an increment bit 130. The increment bit 130 is set to a logic "1" if the multiplicand 200 is to be incremented, or logic "0" if it is not to be incremented. Increment/convert bits 132–148 are generated 412. The increment/convert bits 132–148 correspond to multiples 302–312 of the multiplicand. An increment/convert bit 132 is equal to the exclusive OR 150 of 1) a multiple's sign bit 160, and 2) the increment bit 130 which indicates whether the multiplicand is to be incremented. The bits of negative multiples are inverted 414. Finally, appropriately aligned increment/convert bits 132–148 are added 420 to their corresponding multiples 302–312 of the multiplicand.

The above methods 422, 424 may be combined 400 if it is desired to increment both the multiplier 102 and the multiplicand as they are input into the Booth recoded multiply array 100.

Having thus described a method 400 of performing operand increment in a Booth recoded multiply array 100 in general, the method 400 will now be described in further detail.

In a preferred embodiment, the method 400 of performing operand increment in a Booth recoded multiply array 100 commences as two operands, a multiplicand and a multiplier 102, are input into a Booth recoded multiply array 100. Refer to FIGS. 1 & 4. As required by Booth's algorithm, the multiplier 102 is partitioned 402 into overlapping groups 104–120 of N bits, where N is any integer greater than two.

For example, take N=3, as shown in FIG. 1. A window of three bits 104 is then positioned over the least significant bits 122, 124 of the multiplier 102 so that the window 104 overlaps the least significant bit 122 of the multiplier 102 by one bit. In a standard application of Booth's algorithm, this "placeholder bit", P 126, would be set to logic "0". See FIG. 5. The placeholder bit 126 is required by Booth's algorithm, but its value is trivial, and it is always set to "0". After creating a first partition 104, the window of N bits (e.g., three bits) is shifted N–1 bits (e.g., 2 bits) to identify a second partition 106 of the multiplier 102. The window is shifted repeatedly, and additional partitions 108–120 are identified, until at some point the window 120 is "overshifted". That is, the window 120 is shifted so as to have a portion extend past the most significant bit 164 of the multiplier 102. Like the less significant placeholder bit 126, any bits 166, 168 within the scope of the window 120 which are more significant than the bits 164 of the multiplier 102 are set to "0". These bits are once again needed for application of Booth's algorithm, but their values are trivial.

The example above, wherein N=3, is known as "Booth 2". The "2" refers to the number of bits the partitioning window is shifted before a new partition is created (i.e., N–1=3–1=2).

As the multiplier is partitioned 402, or even prior to the partitioning, a number of multiples 302–312 (FIG. 3) of the multiplicand are generated 406. Booth 2 requires generation 406 of the multiples ±0, ±M, and ±2M (where M represents the value of the multiplicand). Booth 3 requires generation 406 of the multiples ±0, ±M, ±2M, ±3M, and ±4M. Additional multiples of the multiplicand are necessary as the order of Booth is increased. Details of the Booth algorithm may be found in the articles of Booth and MacSorley, referred to supra.

Even multiples 306, 308 are generated by shifting 408 the bits of a multiplicand 200 one or more bits to the left 204. Vacant bit positions 202 created by the left-shifts are conventionally filled with "0"s. In a conventional Booth recoded multiply array 100 (FIG. 5), negative multiples 308–312 of the multiplicand are inverted 414 and incremented (i.e., converted to 2's complement form). Incrementation may be accomplished by adding a 2's complement convert bit 502–516 to the least significant bit of a multiple 302–312. The 2's complement convert bit 502–516 is equivalent to a multiple's sign bit (i.e., a "1" if the multiple is negative, or a "0" if the multiple is positive). Adding 420 of the 2's complement convert bits 502–516 may be performed as incident to an add 420 of the multiply array's partial products 170.

Once a multiplier 102 is partitioned 402, and the necessary multiples 302–312 of a multiplicand have been generated 406, partial products 170 to be added in the multiply array 100 must be selected 416. Selection 416 of partial products 170 is performed by mapping partitions 104–120 to a specified multiple 302–312 of the multiplicand. A table 300 showing how Booth 2 partitions 104–120 are mapped into multiples 302–312 of a multiplicand is shown in FIG. 3. Note that the mappings are based on various combinations of bits 314–328 found in the multiplier partitions 104–120.

After selecting 416 the appropriate multiples 302–312 of the multiplicand, the partial products 170 are shifted 418 within a multiply array 100 and added 420. Each successive partial product is shifted N–1 bits to the left of the most significant bit of the partial product representing a prior partition (e.g., the partial product recoding of the second partition 106 is shifted N–1 bits to the left of the partial product recoding of the first partition 104).

The partial products 170 are then added 420. As earlier stated, rather than individually adding in the 2's complement convert bits associated with each of the generated multiples, the 2's complement convert bits, S 502–516, are added 420 to each of their corresponding multiples 302–312 as incident to adding 420 the partial products 170 in the multiply array 100. A multiply result 172 is thereby obtained.

Now that a framework 100, 400 for implementing Booth's algorithm has been established, incrementation of the multiply array's operands will be examined. Refer to FIG. 1. Incrementation 404 of the multiplier 102 may be done by setting the placeholder bit, P 126, appended to the least significant bits 122, 124 of the multiplier 102 to a logic "1". When mapping the multiplier's partitions 104–120 into multiples 302–312 of the multiplicand, setting the placeholder bit 126 (which in conventional implementations of Booth's algorithm is always a zero, FIG. 5) to a "1" has the 'de facto' affect of incrementing 404 the multiplier 102. Yet realize that a formal incrementation, comprising the steps of 1) adding a "1" to the multiplier's least significant bit 122, and then 2) propagating any carry through the remainder of the multiplier's bits, has not occurred. Thus, in using the method 422 disclosed herein, incrementation 404 of the multiplier 102 is independent of the value of the multiplier's least significant bits 122, 124, and incrementation may be performed without using an additional adder (i.e., an extra partial product slot in the multiply array 100, as has been used in the past). One can readily appreciate the fact that this method 422 of incrementing 404 a multiplier 102 does not add any additional delay in generating a multiply result 172. Assuming that a multiply array 100 receives operands A (a multiplicand), A_INC (a bit indicating whether A is to be incremented), B (a multiplier 102), and B_INC 128 (a bit indicating whether B is to be incremented), and performs the operation A*B, incrementation 404 of B may be performed by feeding the value of B_INC 128 into the placeholder bit 126 used in partitioning 402 the multiplier 102. Note that A_INC and/or B_INC are/is set to a logic "1" if either A and/or B are/is to be incremented.

Two changes to a conventional Booth implementation are needed in order to implement a multiplicand increment feature 424. First, each of the 2's complement convert bits, S 502–516, associated with multiples 302–312 of the multiplicand must be XORd 412 with a bit 130 indicating whether the multiplicand is to be incremented (e.g., in FIG. 1, exclusively ORing 412 each S bit 502 with the value of A_INC 130). The result of the exclusive ORing will be a number of increment/convert bits 132–148 (bits output from the XOR gates 150–158). These bits 132–148, designated R in FIG. 1, are then added to the multiples 302–312 of the multiplicand in place of the S bits 502–516.

Figure 5:
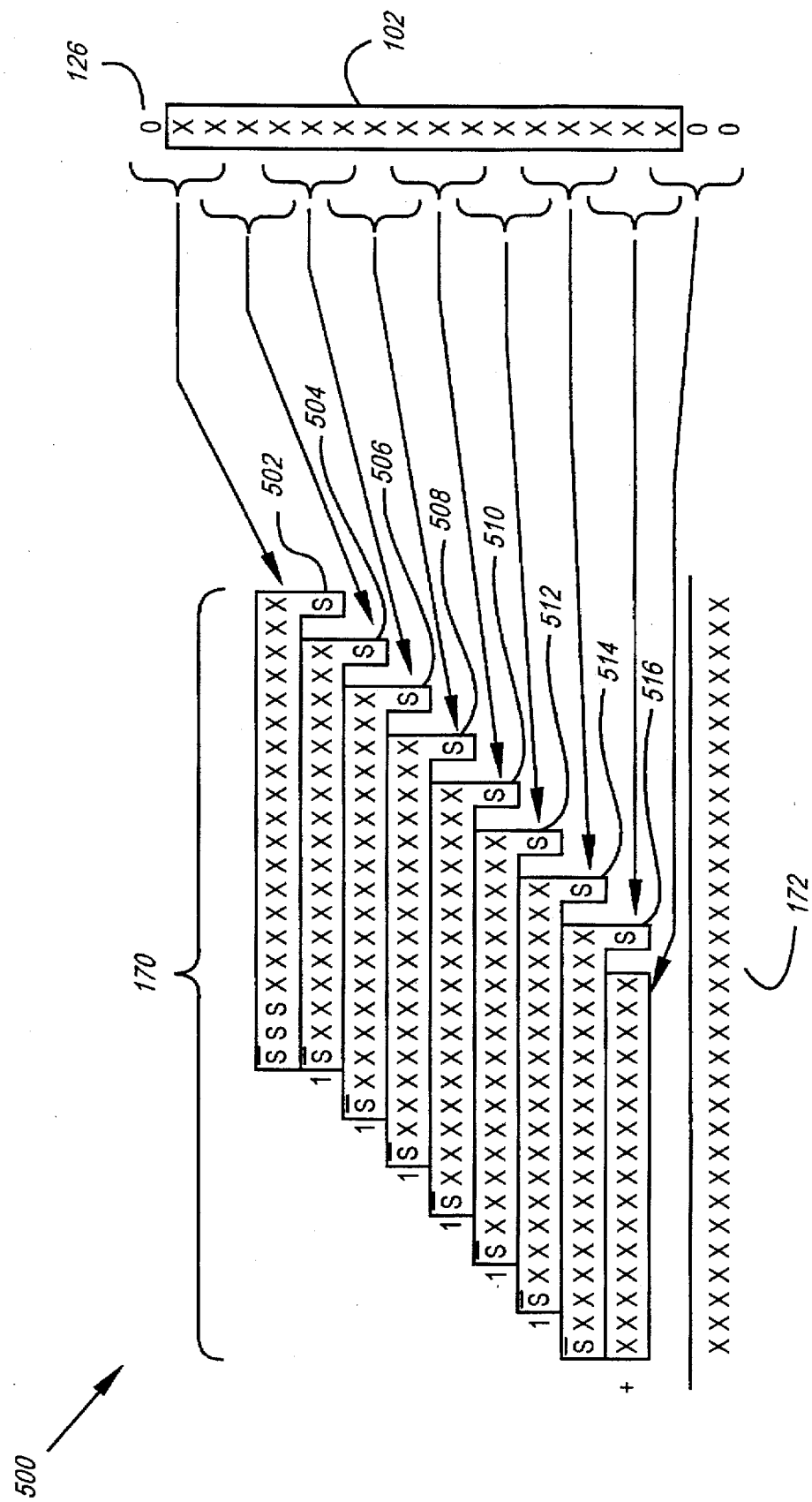
FIG. 5 is a schematic illustrating a conventional Booth recoded multiply array.

The theory behind this method 424 of incrementing the multiplicand is more fully explained as follows. For a positive multiple 302–306, its corresponding S bit will always be a "0", and incrementation will be determined by the multiplicand increment bit (A_INC 130). For a negative multiple 308–312, its corresponding S bit will always be a "1". However, if a number is incremented (i.e., due to A_INC 130), its bits are inverted 414, and then the number is incremented again (i.e., due to a 2's complement convert bit 502–516)—the two increments have a net effect of zero. They cancel each other out. Thus, an exclusive-ORing of the two increment bits (i.e., the 2's complement conversion bits 502–516, and the multiplicand increment bit 130) will cause an increment of a negative multiplicand 308–312 to occur only when one (but not both) of the increment bits is set. In this manner, the bits R 132–148 can be added to their respective multiples 302–312 of the multiplicand during the add of partial products 170, as is currently done in conventional Booth recoded multiply arrays 500 (FIG. 5). The only additional hardware required is a plurality of exclusive OR logic gates 150–158. These gates 150–158 are small, inexpensive, and do not add to the delay of the multiply array 100.

Note that the above change to the multiply array 100 only accounts for multiples of the multiplicand being incremented by ±1. However, it is necessary to increment ±2M multiples by ±2, ±3M multiples by ±3, and so on. The R bits 132–148 described in the above paragraph, leave an "incrementation gap" with respect to multiples of the multiplicand which are greater than ±1M. Thus ±2M multiples still need to be incremented by another ±1, ±3M multiples still need to be incremented by another ±2, and so on. These additional increments can be made by filling 410 bit vacancies 202 produced by the shifting required in generating even multiples, with bits equivalent to the multiplicand increment bit (i.e., A_INC 130).

If the multiplicand is to be incremented, A_INC 130 will be "1". Generation of a +2M multiple 206 (FIG. 2) requires a single left shift 204 of the multiplicand 200. The bit vacancy, V 202, created by this shift is filled with a "1". Note that this adds the missing +1 to the +2M multiple; and adds the −1 to a −2M multiple when the +2M multiple is inverted and incremented to generate the −2M multiple. In generating a +4M multiple, two bit vacancies will be created during left shifts 204 of the multiplicand. If both of these vacancies are filled with "1"s, the multiple is incremented by +3, thus filling the incrementation gap for a total increment of +4.

If A_INC 130 is "0", indicating that the multiplicand is not to be incremented, bit vacancies 202 created during left shifts 204 of the multiplicand are merely filled with "0"s.

Although not previously discussed, one skilled in the art will know that odd multiples of the multiplicand are usually generated by adding an even multiple to a ±1M multiple of the multiplicand. When applying the above teachings to odd multiples of the multiplicand, one can see that odd multiples are also correctly incremented. For example, a +3M multiple will actually comprise the sum of a +2M multiple and a +1M multiple. A distinct R bit is associated with both the +2M and +1M multiple. Additionally, a multiplicand increment bit 130 may be shifted into the +2M multiple. Thus, availability of the three increments allows the +3M multiple to be incremented by +3.

By incrementing the multiplier 102 and multiplicand of a Booth recoded multiply array 100 as described above, no additional partial product slots 170 are needed (other than those already required by a conventional Booth recoded multiply array 500). By avoiding the use of additional partial product slots, the surface area on an IC which is required to implement an operand increment Booth recoded multiply array 100 is not substantially increased. Furthermore, the avoidance of additional partial product slots means that no additional delay is incurred during an incrementation of either (or both) the multiplicand or the multiplier 102.

Figure 6:
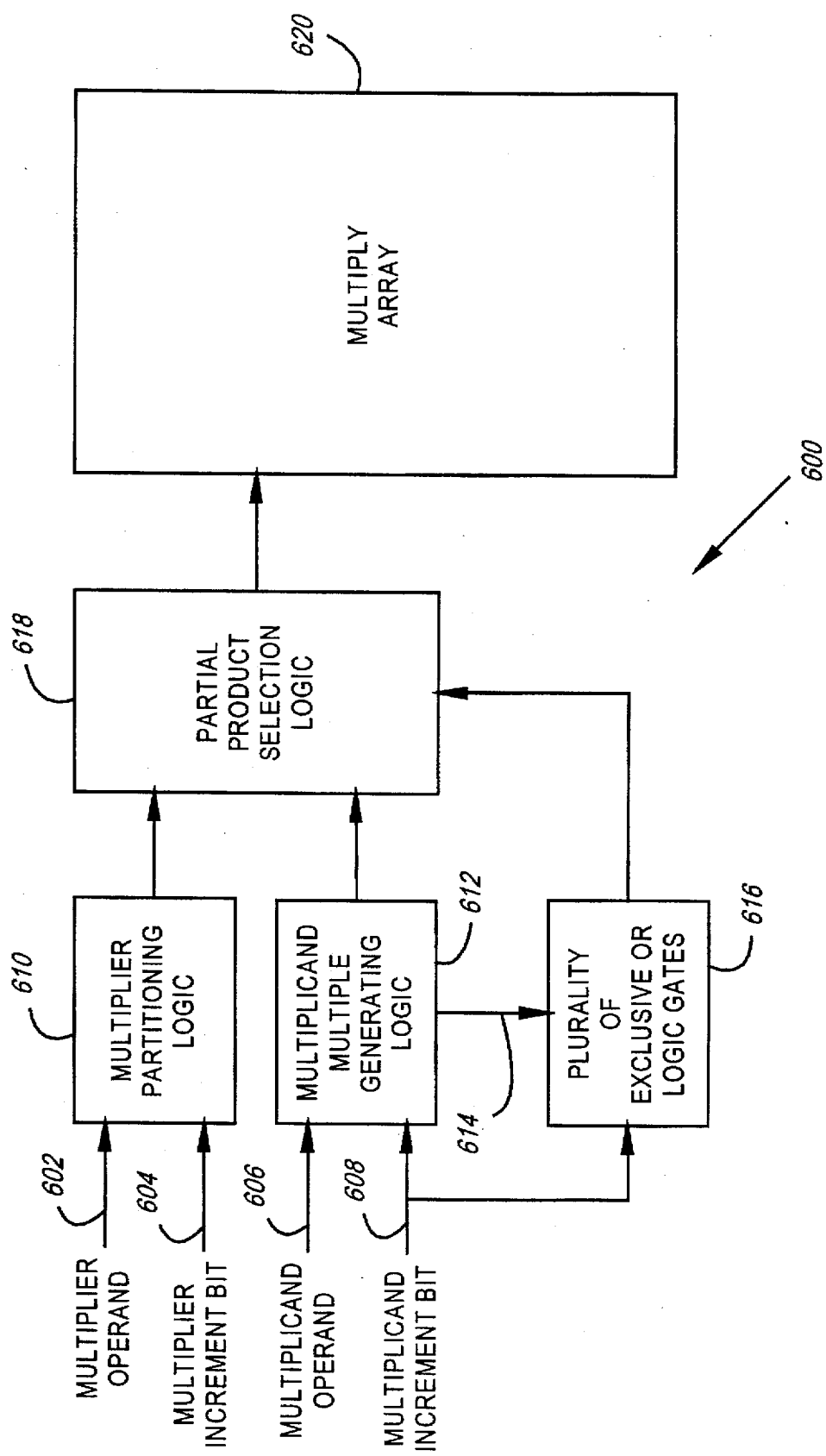
FIG. 6 is a schematic illustrating a macro-view of hardware used in implementing the invention.

FIG. 6 illustrates a macro-view 600 of the FIG. 1 multiply array 100. The view is more from a hardware standpoint than a functional standpoint. As can be seen in the figure, multiplier partitioning logic 610 has inputs for a multiplier operand 602 and multiplier increment bit 604. Multiplicand multiple generating logic 612 has inputs for a multiplicand operand 606 and a multiplicand increment bit 608. A plurality of exclusive OR logic gates 616 receive sign bits 614 associated with generated multiples. The exclusive OR gates 616 also receive the multiplicand increment bit 608. The outputs of the multiplier partitioning logic 610, multiplicand multiple generating logic 612, and plurality of exclusive OR logic gates 616 are received by partial product selection logic 618, and partial products (along with appropriate increment/convert bits) are delivered to a multiply array 620 for summation.

A Booth recoded multiply array of the type described herein is especially useful in an FMAC (floating-point multiply accumulate unit). The invention may be used in conjunction with conventional signed magnitude FMACs (so long as they comprise a Booth recoded multiply array), or with a fully 2's complement FMAC such as that disclosed in the U.S. patent application of Naffziger filed concurrently herewith entitled "2's Complement Floating-Point Multiply Accumulate Unit", which is hereby incorporated by reference for all that it discloses. The FMAC described performs the operation (A*B)+C, and allows incrementation of all operands (through bits A_INC, B_INC and C_INC). In such an FMAC, multiples of the multiplicand, A, may be generated in parallel to the incrementation of C (i.e., C+C_INC). Absorption of the A_INC and B_INC may occur as part of a Booth recoded A*B multiply operation, as described above. In this manner, no additional delay is incurred in incrementing any or all of the A, B and/or C operands.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A method of performing operand increment in a Booth recoded multiply array, the method comprising:
   a) partitioning a multiplier into overlapping groups of N bits, wherein a first of a number of multiplier partitions comprises,
      i) the multiplier's least significant bits; and
      ii) a placeholder bit of less significance than the multiplier's least significant bits; and
   b) setting the placeholder bit to a logic "1" when desiring to increment the multiplier, else setting the placeholder bit to a logic "0".

2. A method as in claim 1, further comprising the steps of:
   a) generating 2's complement multiples of a multiplicand;
   b) selecting partial products to be added in the multiply array, said selection being based on a recoding of the number of multiplier partitions as multiples of the multiplicand;
   c) shifting the partial products N−1 bits with respect to partial products based on neighboring partitions; and
   d) adding the partial products.

3. A method as in claim 1, further comprising the steps of:
   a) generating signed magnitude multiples of a multiplicand, wherein,
      i) generation of even multiples necessitates shifting the multiplicand; and
      ii) least significant bit vacancies created by said shifting are filled with an increment bit, the increment bit being set to logic "1" if the multiplicand is to be incremented, or being set to logic "0" if the multiplicand is not to be incremented;
   b) generating increment/convert bits corresponding to each multiple of the multiplicand, each increment/convert bit being equal to an exclusive OR of a multiple's sign bit and the increment bit, the multiple's sign bit being set to logic "1" if the multiple is negative, or being set to logic "0" if the multiple is positive;
   c) inverting each bit of a negative multiple; and
   d) adding appropriately aligned increment/convert bits to their corresponding multiples of the multiplicand.

4. A method as in claim 3, wherein appropriate alignment of an increment/convert bit and its corresponding multiple of the multiplicand comprises aligning the increment/convert bit with a least significant bit of its corresponding multiple of the multiplicand.

5. A method as in claim 3, further comprising the steps of:
   a) selecting partial products to be added in the multiply array, said selection being based on a recoding of the number of multiplier partitions as multiples of the multiplicand;
   b) shifting the partial products N−1 bits with respect to partial products based on neighboring partitions; and
   c) adding the partial products.

6. A method as in claim 5, wherein the steps of adding appropriately aligned increment/convert bits to their corresponding multiples of the multiplicand, and adding the partial products, are combined in a single adding step.

7. A method of performing operand increment in a Booth recoded multiply array, the method comprising:
   a) generating signed magnitude multiples of a multiplicand, wherein,
      i) generation of even multiples necessitates shifting the multiplicand; and
      ii) least significant bit vacancies created by said shifting are filled with an increment bit, the increment bit being set to logic "1" if the multiplicand is to be incremented, or being set to logic "0" if the multiplicand is not to be incremented;
   b) generating increment/convert bits corresponding to each multiple of the multiplicand, each increment/convert bit being equal to an exclusive OR of a multiple's sign bit and the increment bit, the multiple's sign bit being set to logic "1" if the multiple is negative, or being set to logic "0" if the multiple is positive;
   c) inverting each bit of a negative multiple; and
   d) adding appropriately aligned increment/convert bits to their corresponding multiples of the multiplicand.

8. A method as in claim 7, wherein appropriate alignment of an increment/convert bit and its corresponding multiple of the multiplicand comprises aligning the increment/convert bit with a least significant bit of its corresponding multiple of the multiplicand.

9. A method as in claim 7, further comprising the steps of:
   a) partitioning a multiplier into overlapping groups of N bits;
   b) selecting partial products to be added in the multiply array, said selection being based on a recoding of a number of multiplier partitions as multiples of the multiplicand;
   c) shifting the partial products N−1 bits with respect to partial products based on neighboring partitions; and
   d) adding the partial products.

10. A method as in claim 9, wherein the steps of adding appropriately aligned increment/convert bits to their corresponding multiples of the multiplicand, and adding the partial products, are combined in a single adding step.

11. In a floating-point multiply accumulate unit (FMAC) having A, B, C, A_INC, B_INC, and C_INC inputs and performing an accumulate operation of a form [(A+A_INC)*(B+B_INC)]+(C+C_INC), a method of performing operand increment within a Booth recoded multiply array of the FMAC, the method comprising:
   a) partitioning B into overlapping groups of N bits, wherein a first of a number of B partitions comprises,
      i) B's least significant bits; and
      ii) a placeholder bit of less significance than B's least significant bits; and
   b) setting the placeholder bit equal to B_INC;
   c) generating signed magnitude multiples of A, wherein,
      i) generation of even multiples necessitates shifting A; and
      ii) least significant bit vacancies created by said shifting are filled with A_INC, A_INC being set to logic "1" if A is to be incremented, or being set to logic "0" if A is not to be incremented;
   d) generating increment/convert bits corresponding to each multiple of A, each increment/convert bit being equal to an exclusive OR of a multiple's sign bit and A_INC, the multiple's sign bit being set to logic "1" if the multiple is negative, or being set to logic "0" if the multiple is positive;

e) inverting each bit of a negative multiple; and f) adding appropriately aligned increment/convert bits to their corresponding multiples of A.

12. A method as in claim 11, wherein appropriate alignment of an increment/convert bit and its corresponding multiple of A comprises aligning the increment/convert bit with a least significant bit of its corresponding multiple of A.

13. A method as in claim 11, further comprising the steps of:

a) selecting partial products to be added in the multiply array, said selection being based on a recoding of the number of the number of B partitions as multiples of A;

b) shifting the partial products N-1 bits with respect to partial products based on neighboring partitions; and c) adding the partial products.

14. A method as in claim 13, wherein the steps of adding appropriately aligned increment/convert bits to their corresponding multiples of A, and adding the partial products, are combined in a single adding step.

15. A method as in claim 11, wherein the operation (C+C_INC) is performed in parallel with the generation of multiples of A.

16. In a Booth recoded multiply array having multiplier operand, multiplicand operand, multiplier increment bit and multiplicand increment bit inputs, multiplier partitioning logic, multiplicand multiple generating logic, and partial product selection logic, an improvement for adding the increment bit inputs to their respective operand inputs, the improvement comprising:

a) a wiring path feeding the multiplier increment bit into a placeholder bit used by the multiplier partitioning logic, the placeholder bit being of less significance than the multiplier operand's least significant bits;

b) one or more wiring paths feeding the multiplicand increment bit into least significant bit vacancies created by the multiplicand multiple generating logic during shifts of the multiplicand operand; and c) a plurality of exclusive OR logic gates, each logic gate comprising an input corresponding to a sign bit of a multiplicand multiple, a multiplicand increment input, and an output, the output being fed to a bit position of the multiply array, the bit position being aligned with a least significant bit of the multiplicand multiple which sign bit was input into the exclusive OR logic gate.

* * * * *